United States Patent [19]

Porter, Jr.

[11] Patent Number: 5,197,832

[45] Date of Patent: Mar. 30, 1993

[54] PORTER HOUSING TAP

[76] Inventor: John C. Porter, Jr., 4026 E. Roberts Pl., Tucson, Ariz. 85711

[21] Appl. No.: 872,679

[22] Filed: Apr. 20, 1992

[51] Int. Cl.$^5$ .............................................. B23G 5/06
[52] U.S. Cl. ............................... 408/222; 15/236.08; 15/104.05; 470/198
[58] Field of Search ............................. 408/215–220, 408/222; 470/198, 209; 15/104.1 R, 236.06, 236.07, 236.08, 104.05

[56] References Cited

U.S. PATENT DOCUMENTS

| | | | |
|---|---|---|---|
| 876,964 | 1/1908 | Holmes et al. | 470/198 X |
| 984,577 | 2/1911 | Maglenn | 15/236.07 X |
| 2,567,480 | 9/1951 | Heldenbrand | 408/239 R X |
| 4,121,486 | 10/1978 | Frank | 15/104.05 X |

Primary Examiner—Steven C. Bishop

[57] ABSTRACT

Machine thread cleaning tool which is quick and simple and does not recut threads and therefore does not require replacing connecting components, but merely removes corrosion and dirt. The tool, or chaser, does not require that components extending outward from the machine casing be removed and the chasing can be accomplished using a basic spanner wrench. The tool comprises a disk with bores through the center thickness and parallel grooves running along the circumference of the disk and across the entire thickness.

3 Claims, 1 Drawing Sheet

PORTER HOUSING TAP

FIELD OF THE INVENTION

This invention relates generally to thread cleaning devices, and more particularly to internal machine thread chasers.

BACKGROUND OF THE INVENTION

Transmission or pipe systems usually include internally threaded connecting elements. The threads are often designed to either seal internal pressures to prevent leakage or retain mechanical components.

Pipes transporting gas, water, or some other substance usually contain connecting components in which the threads are tapered, decreasing in size from the pipe opening. The threads are tapered to provide a very tight fit which will provide a mechanical seal to prevent leakage. On the other hand, pipes, machine threads or the like whose primary function is to retain mechanical components are generally not tapered, the size of the threading is consistent throughout.

It is often necessary to clean or restore worn, irregular or defective machine threading. Devices exist which will cut new threads into worn, or irregular threading, but these devices modify the size and diameter of the original threading and actually remove the original threaded material. Since the original threaded material is removed, the original connecting components are rendered useless, and therefore these devices are not effective for merely removing corrosion and dirt from threads with the intent of reassembling the original connecting components.

In contrast to thread cutting devices, thread cleaning or chasing devices simply remove corrosion and dirt while maintaining the original integrity of the threading so that new oversized components are not required upon reassembly. Available chasing devices usually require disassembly of any components protruding from the casing which usually entails hours of expensive labor.

U.S. Pat. Nos. 876,964 and 4,121,486 describe valve or thread restoring devices which cut new threads for worn, irregular or defective valves. Since both of these devices cut into the original threading, they are not effective as chasing devices. Further, U.S. Pat. No. 4,121,486 is particularly unsuitable as a chaser since the device thread diameter is controlled by manually gripping levers, so it is impossible to control the exact size of the thread, and the tool will inevitably cut into the original threads to some degree.

The subject invention is designed to provide a simple and quick method of removing dirt and corrosion while leaving the integrity of the existing threads intact. It does not have the ability to recut threads. It provides a quick method of chasing since both ends of the device are open and it can be used without removing components from the machine casing eliminating the necessity of disassembling parts protruding from the machine casing. U.S. Pat. No. 2,567,480 is an example of a thread cleaning device which is only open on one end and would require complete disassembly and removal of any objects protruding from the threaded casing. The subject invention provides a simple method of chasing since a basic spanner wrench is used to rotate the chaser within the threaded casing to accomplish removal of the dirt and corrosion.

The subject invention is extremely pertinent to the marine industry where mechanical components which are not contained within the hull, but are constantly exposed to the water, are susceptible to corrosion and dirt. For example, subject invention could clean internal sterndrive gear threading without removing the propulsion unit.

OBJECTS OF THE INVENTION

One object of the invention is to provide a tool which removes corrosion and buildup from internal casing threads while maintaining the integrity of the threads.

Another object of the invention is to provide a tool to clean internal casing threads without removing protruding mechanical components.

It is also an object of the invention to provide a simple tool which can be combined with basic spanner wrenches to accomplish the chasing.

SUMMARY OF THE INVENTION

These and other objects of the invention are achieved by the provisions of a tool comprising a disk of thickness equal to the machine threading sought to be cleaned or chased. A large hole runs through the center of the thickness of the disk and smaller holes are placed at 90 degree angles apart between the center whole and the circumference of the disk. Parallel grooves run along the circumference of the disk, the entire width of the disk thickness, from the front to the back surface of the disk.

An important feature of the subject invention is the intervals of parallel grooves being slightly offset from the grooves of the next interval. This feature, combined with the grooves of each interval starting at full depth and tapering down to zero depth to form a notch between thread intervals facilitates the rotating motion of the disk into the threaded machine casing to remove the corrosion and dirt within th threads.

In accordance with another aspect of the invention, the tool comprises one large bore and four smaller bores through the center of the disk thickness. The large bore permits inserting the disk over any machine or gear components extending from the machine casing which allows the user to avoid removing any components protruding from the machine casing. The smaller bores provide a means of inserting the spanner wrench to provide leverage to turn the disk and clean the machine threads.

DESCRIPTION OF THE PREFERRED EMBODIMENT

Figure 1:
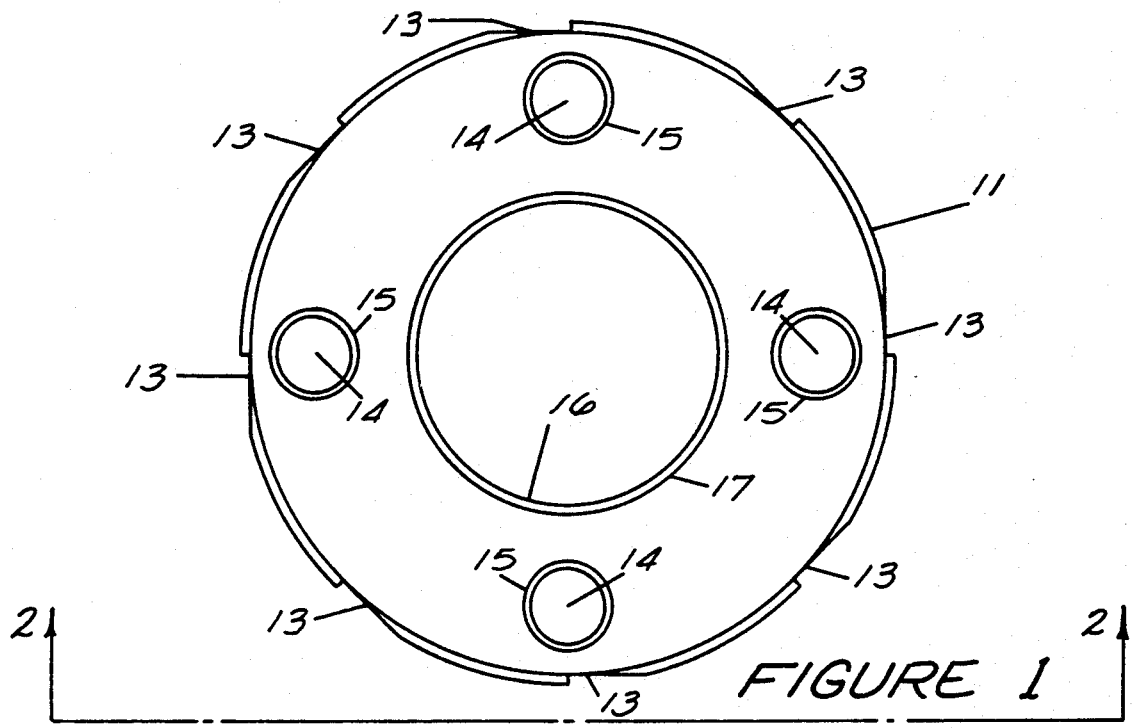
FIG. 1 is a top view of a tool for use on internal threads showing center bore and spanner wrench accommodations.
Figure 3:
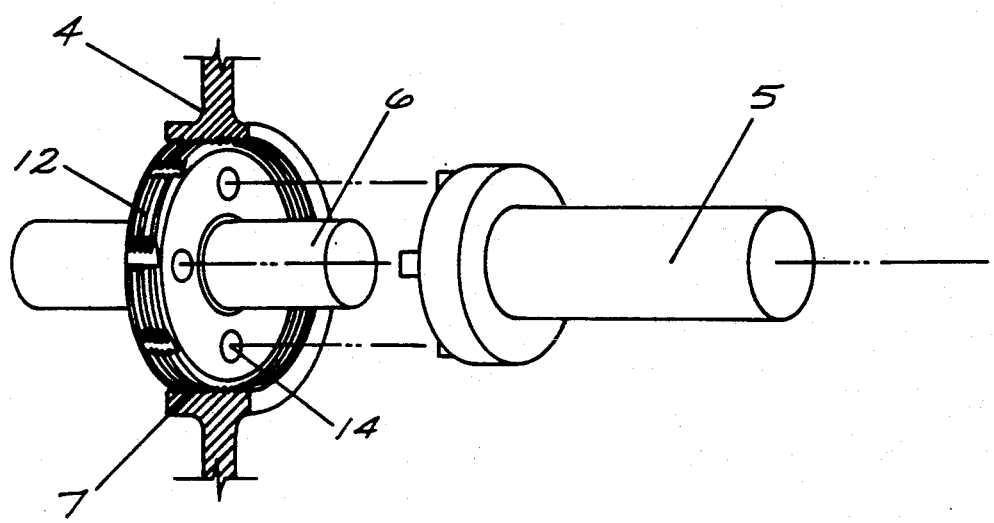
FIG. 3 is a fragmentary plan view partially in section showing the operating position of the tool.

Referring now to the embodiment of the invention illustrated in the drawings by way of example only, there is illustrated in FIG. 1 a thread chaser which is generally designated by the numeral 20. The tool 20 comprises a center bore 16 with a 45 degree tapered entry 17 to accommodate any mechanical components 6 extending from the machine chasing 4 as shown in FIG. 3. Four symmetrically spaced bores 14 surround the center bore and also have 45 degree tapered entries 15 to accommodate the male portions of a spanner wrench 5.

Figure 2:
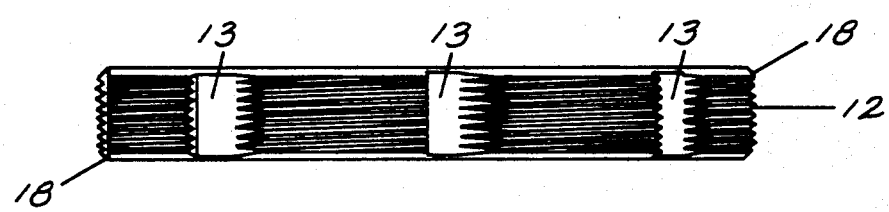
FIG. 2 is a side view showing the threading and reliefs spaced intermittently between the threads.

Machine thread cleaning grooves 12 are cut along the outer diameter 11 of the disk as illustrated in FIG. 2. The threads taper 18 from full depth to zero depth resulting in notches or reliefs 13 between the segments of threads. As shown in FIG. 3, this tapering allows the tool 20 to be inserted and removed from the threaded machine casing 4 with ease and to make contact with the threads 7 sought to be cleaned.

I claim:

1. A tool for removing corrosion and buildup from internal machine threads comprising:
    a disk having a center bore through the disk thickness, smaller holes through the disk thickness spaced symmetrically between the center bore and the outer diameter of the disk; and
    a plurality of symmetrically spaced grooves extending inward along the thickness of the disk circumference from the front surface to the back surface of the disk at spaced intervals, the outer periphery defining a circular surface for aligning the grooves with corresponding external grooves on an inverted circular surface to remove corrosion and debris.

2. A tool as recited in claim 1, for cleaning machine thread casings, wherein:
    intervals of grooves are slightly offset from the grooves of the preceding interval; and
    intervals of grooves start from full depth at the beginning of the interval and taper down to zero depth at the end of the interval resulting in a notch between each interval of grooves.

3. A tool as recited in claim 2, for temporarily inserting into internal thread casings, wherein:
    the disk includes a large bore through the center thickness of the disk for accommodating any mechanical components protruding from the center of the threaded casing; and
    the disk also includes four smaller wholes symmetrically placed toward the outer edges of the surface of the disk as a means of inserting and removing the disk from the threaded casing using a basic spanner wrench to accomplish the chasing.

* * * * *